(12) United States Patent
Li et al.

(10) Patent No.: US 11,392,287 B2
(45) Date of Patent: Jul. 19, 2022

(54) METHOD, DEVICE, AND STORAGE MEDIUMFOR SWITCHING AMONG MULTIMEDIA RESOURCES

(71) Applicant: BEIJING DAJIA INTERNET INFORMATION TECHNOLOGY CO., LTD., Beijing (CN)

(72) Inventors: Qian Li, Beijing (CN); Jiarui Ren, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/137,904

(22) Filed: Dec. 30, 2020

(65) Prior Publication Data

US 2021/0405859 A1 Dec. 30, 2021

(30) Foreign Application Priority Data

Jun. 30, 2020 (CN) .......................... 202010617054.8

(51) Int. Cl.
| | | |
|---|---|---|
| *G06F 3/048* | (2013.01) | |
| *G06F 3/04847* | (2022.01) | |
| *G06F 3/0482* | (2013.01) | |
| *G06F 3/0483* | (2013.01) | |

(52) U.S. Cl.
CPC ........ *G06F 3/04847* (2013.01); *G06F 3/0482* (2013.01); *G06F 3/0483* (2013.01)

(58) Field of Classification Search
None
See application file for complete search history.

(56) References Cited

U.S. PATENT DOCUMENTS

| | | | | |
|---|---|---|---|---|
| 8,661,363 | B2 * | 2/2014 | Platzer | ................... G06F 3/0488 |
| | | | | 715/784 |
| 2011/0246928 | A1 * | 10/2011 | Braunstein | .......... G06F 3/03547 |
| | | | | 715/775 |
| 2014/0189580 | A1 * | 7/2014 | Kawamata | ............ G06F 3/0488 |
| | | | | 715/784 |

FOREIGN PATENT DOCUMENTS

| | | |
|---|---|---|
| CN | 105872743 A | 8/2016 |
| CN | 106716326 A | 5/2017 |
| CN | 305420030 S | 11/2019 |

OTHER PUBLICATIONS

OA for CN application 202010617054.8.
(Continued)

*Primary Examiner* — William C Trapanese
(74) *Attorney, Agent, or Firm* — Timothy W. Menasco, Esq.; Harter Secrest & Emery LLP

(57) ABSTRACT

The disclosure can provide a method, an electronic device, and a storage medium for switching among multimedia resources. The method may include the following. A following sub-resource of a current sub-resource is displayed in response to a sliding operation on the current sub-resource, in which the following sub-resource is adjacent to the current sub-resource and is to be displayed along a sliding direction of the sliding operation, and the current sub-resource and the following sub-resource are included in a first multimedia resource. Responding to the sliding operation is terminated in response to the first multimedia resource including no following sub-resource. A second multimedia resource is obtained in response to a switching instruction, in which the second multimedia resource is associated with the first multimedia resource. The second multimedia resource is displayed.

17 Claims, 10 Drawing Sheets

(56) References Cited

OTHER PUBLICATIONS

English translation of OA for CN application 202010617054.8.
How to set Aauto Quicker to slide left to see other works of the author.
Android imitates the function of sliding to the last picture and jumping on the Taobao details page.
English translation of How to set Aauto Quicker to slide left to see other works of the author.
English translation of Android imitates the function of sliding to the last picture and jumping on the Taobao details page.

* cited by examiner

METHOD, DEVICE, AND STORAGE MEDIUMFOR SWITCHING AMONG MULTIMEDIA RESOURCES

CROSS-REFERENCE TO RELATED APPLICATION

This application is based on and claims priority to Chinese Patent Application No. 202010617054.8 filed on Jun. 30, 2020, the disclosure of which is hereby incorporated herein by reference.

FIELD

The disclosure relates to the field of computer application technology (CAT), and more particularly, to a method, an electronic device, and a storage medium for switching among multimedia resources.

BACKGROUND

Terminal devices may provide more and more functions, such as browsing multimedia resources (e.g., multiple pictures, or albums, in which the album may be a collection of pictures). In the related art, a user may close a currently browsed album in the device and open a next multimedia resource such as anther album to enter the next multimedia resource.

However, this manner of browsing multimedia resources has a complicated operation path and a slow speed.

SUMMARY

According to embodiments of the disclosure, a method is provided. The method includes: displaying a following sub-resource of a current sub-resource in response to a sliding operation, in which the sliding operation is based on the current sub-resource, the following sub-resource is adjacent to the sub-resource and is to be displayed along a sliding direction of the sliding operation, and the current sub-resource and the following sub-resource are included in a first multimedia resource; terminating responding to the sliding operation in response to the first multimedia resource including no following sub-resource; obtaining a second multimedia resource in response to a switching instruction, in which the second multimedia resource is associated with the first multimedia resource; and displaying the second multimedia resource.

According to embodiments of the disclosure, an electronic device is provided. The electronic device includes a processor and a storage device configured to store instructions executable by the processor. The processor is configured to execute the instructions to: display a following sub-resource of a current sub-resource in response to a sliding operation, in which the sliding operation is based on the current sub-resource, the following sub-resource is adjacent to the sub-resource and is to be displayed along a sliding direction of the sliding operation, and the current sub-resource and the following sub-resource are included in a first multimedia resource; terminate responding to the sliding operation in response to the first multimedia resource including no following sub-resource; obtain a second multimedia resource in response to a switching instruction, in which the second multimedia resource is associated with the first multimedia resource; and display the second multimedia resource.

According to embodiments of the disclosure, a computer-readable storage medium is provided. The computer-readable storage medium has stored therein instructions that, when executed by a processor of an electronic device, causes the electronic device to carry out: displaying a following sub-resource of a current sub-resource in response to a sliding operation, in which the sliding operation is based on the current sub-resource, the following sub-resource is adjacent to the sub-resource and is to be displayed along a sliding direction of the sliding operation, and the current sub-resource and the following sub-resource are included in a first multimedia resource; terminating responding to the sliding operation in response to the first multimedia resource including no following sub-resource; obtaining a second multimedia resource in response to a switching instruction, in which the second multimedia resource is associated with the first multimedia resource; and displaying the second multimedia resource.

The above general description and the following detailed description are exemplary and explanatory, and cannot limit the disclosure.

BRIEF DESCRIPTION OF THE DRAWINGS

The drawings herein are incorporated into the specification and form a part of the specification, illustrating embodiments consistent with the disclosure and used together with the specification to explain the principles of the disclosure, and do not constitute undue limitations to the disclosure.

DETAILED DESCRIPTION

In order to enable those of ordinary skill in the art to better understand technical solutions of the disclosure, technical solutions in embodiments of the disclosure will be described clearly and completely as follows with reference to the drawings.

It should be noted that terms "first" and "second" in the specification and claims of the disclosure and the above-mentioned drawings are used to distinguish similar objects, and are not necessarily used to describe a specific sequence or order. It should be understood that data indicated in this way can be interchanged under appropriate circumstances so that the embodiments of the disclosure described herein can be implemented in an order other than those illustrated or described herein. The implementation manners described in the following embodiments do not represent all implementation manners consistent with the disclosure. Rather, they are merely examples of devices and methods consistent with some aspects of the disclosure as detailed in the appended claims.

A short-form video may implement a mode of browsing pictures with background music, such as browsing a multimedia resource (e.g. multiple pictures, an album of pictures). The pictures may have the same form or different forms.

In related arts, when a user finishes browsing an album, he/she may close the currently browsed album, and operate again to enter a next multimedia resource such as another album. However, this manner has a complicated operation path and a slow operation speed.

Figure 1:
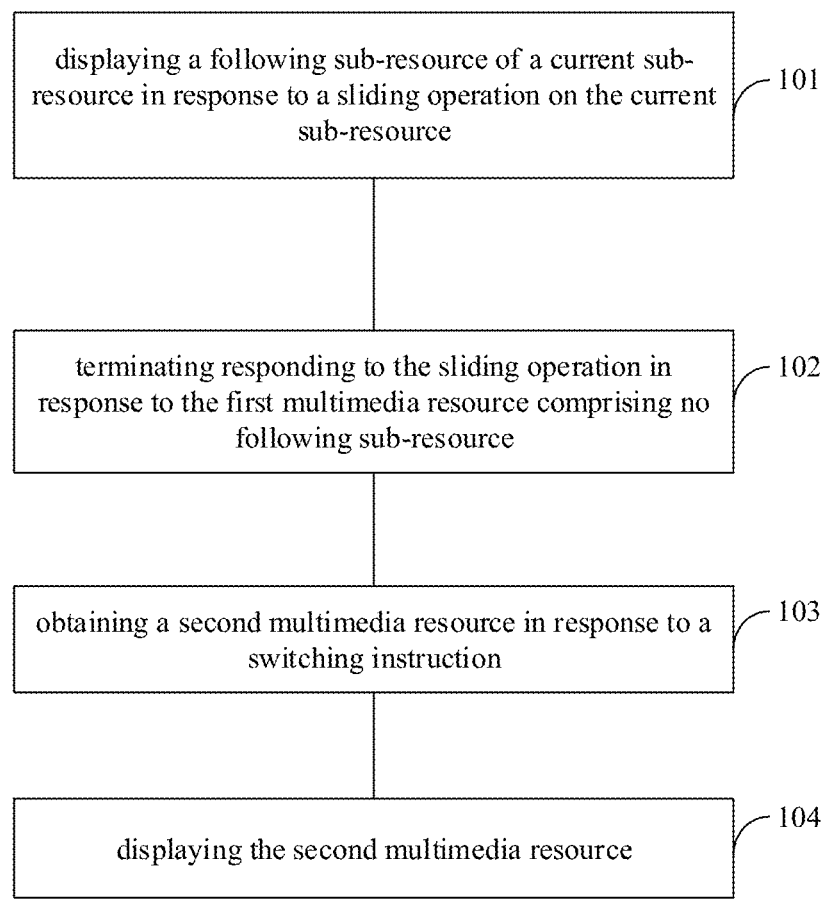
FIG. 1 is a flowchart illustrating a method for switching among multimedia resources according to some embodiments of the disclosure.

Therefore, embodiments of the disclosure provide a method, which may be described below with reference to FIG. 1. FIG. 1 is a flowchart illustrating a method for switching among multimedia resources according to some embodiments of the disclosure. As illustrated in FIG. 1, the method is applicable to a terminal device, such as a mobile phone or a table computer. The method includes the following.

At block 101, the terminal device can display a following sub-resource of a current sub-resource in response to a sliding operation on the current sub-resource, in which the following sub-resource is adjacent to the current sub-resource and is to be displayed along a sliding direction of the sliding operation, and the current sub-resource and the following sub-resource are included in a first multimedia resource.

That is, the first multimedia resource includes the following sub-resource (or the following sub-resource exists in the first multimedia resource).

In some embodiments, the terminal includes a screen. The screen may be a touch screen. Therefore, a user may touch, slide, or press on the touch screen, which is not limited herein. When the user browses multimedia resources (such as videos, albums) on the terminal, he/she may make the sliding operation on the current sub-resource in any multimedia resource. To facilitate the distinction, the multimedia resource being browsed currently is referred to as the first multimedia resource. For example, if the first multimedia resource is an album, each picture in the album is the sub-resource. The user may slide the pictures in the album to the left, or slide the pictures in the album to the right.

When the terminal device obtains the sliding operation on the current sub-resource of the first multimedia resource, the terminal device displays the following sub-resource (which is adjacent to the current sub-resource and is to be displayed along the sliding direction of the sliding operation). Therefore, the user can browse sub-resources in the first multimedia resource through the sliding operations. To facilitate the distinction, the current sub-resource is referred to a sub-resource on which the sliding operation is applied, and the following sub-resource is referred to a sub-resource which will be displayed in response to the sliding operation.

For example, under a case that the first multimedia resource is an album, the album includes multiple pictures. When a leftward sliding operation on a first picture is obtained, a second picture adjacent to the first picture is displayed. When a leftward sliding operation on the second picture is obtained, a third picture adjacent to the second picture is displayed. When a leftward sliding operation on the third picture is obtained, a fourth picture adjacent to the third picture is displayed. The above processes may be performed sequentially until the last picture in the album is displayed. It is understandable that when the third picture is currently displayed, a rightward sliding operation is made on the third picture, and the second picture adjacent to the third picture may be displayed. When a rightward sliding operation is made on the second picture, the first picture adjacent to the second picture may be displayed.

In some embodiments, the sliding operation on each sub-resource of the first multimedia resource may be determined.

In detail, the sliding direction of the sliding operation corresponds to an order of displaying the sub-resources in the multimedia resource. For example, the sub-resources of the multimedia resource may be displayed sequentially based on leftward sliding operations or rightward sliding operations, or the sub-resources of the multimedia resource may be displayed sequentially based on upward sliding operations or downward sliding operations. A corresponding relationship between the order of displaying the sub-resources in the multimedia resource and the sliding direction of the sliding operation may be set in advance. When the terminal device obtains the sliding operation on a certain sub-resource of the first multimedia resource, the terminal device determines the sliding direction of the sliding operation, and the terminal device determines whether there is the sub-resource to be displayed along the sliding direction based on the corresponding order of displaying the sub-resources in the first multimedia resource.

For example, the leftward sliding direction may correspond to the order of displaying the sub-resources from the first sub-resource to the last sub-resource in the multimedia resource, and the rightward sliding direction may correspond to the reverse order of displaying the sub-resources from the last sub-resource to the first sub-resource in the multimedia resource.

In some embodiments, the rightward sliding direction may correspond to the order of displaying the sub-resources from the first sub-resource to the last sub-resource in the multimedia resource, and the leftward sliding direction may correspond to the reverse order of displaying the sub-resources from the last sub-resource to the first sub-resource in the multimedia resource. Or, the upward sliding direction may correspond to the order of displaying the sub-resources from the first sub-resource to the last sub-resource in the multimedia resource, and the downward sliding direction may correspond to the reverse order of displaying the sub-resources from the last sub-resource to the first sub-resource in the multimedia resource.

Taking the first multimedia resource as the album as an example. The album includes multiple pictures. The leftward sliding direction corresponds to the order of displaying from the first picture to the last picture in the album, and the rightward sliding direction corresponds to the reverse order of displaying from the last picture to the first picture in the album. If the displaying interface of the terminal device currently displays the first picture in the album, the second picture will be displayed in response to the leftward sliding operation on the first picture; the third picture will be displayed in response to the leftward sliding operation on the second picture; the second picture will be displayed in response to the rightward sliding operation on the third picture; and the first picture will be displayed in response to the rightward sliding operation on the second picture.

In some embodiments, if the first multimedia resource has the following sub-resource to be displayed along the sliding direction of the sliding operation, the following sub-resource is displayed. For example, the second sub-resource in the first multimedia resource is currently displayed, and the leftward sliding operation on the second sub-resource is obtained. It is determined that there is the following sub-resource to be displayed along the sliding direction of the leftward sliding operation, that is, the third sub-resource exists in the first multimedia resource. The third sub-resource is displayed on the displaying interface of the terminal device.

At block 102, the terminal device can terminate responding to the sliding operation in response to the first multimedia resource including no following sub-resource.

In some embodiments, under the case that the first multimedia resource does not include the following sub-resource (or the first multimedia resource has no sub-resource to be displayed along the sliding direction of the sliding operation), the sub-resource targeted by the sliding operation (that is the current sub-resource) may be displayed continuously to terminate responding to the sliding operation.

For example, the leftward sliding operation corresponds to the order of displaying from the first sub-resource to the last sub-resource in the first multimedia resource. The displaying interface of the terminal device currently displays the last sub-resource of the first multimedia resource. For the leftward sliding operation on the last sub-resource, it is determined that the first multimedia resource has no sub-resource to be displayed along the sliding direction of the leftward sliding operation. The last sub-resource may continue to be displayed, thereby terminating responding to the leftward sliding operation. For another example, the displaying interface of the terminal device currently displays the first sub-resource of the first multimedia resource. For the rightward sliding operation on the first sub-resource, it is determined that the first multimedia resource has no sub-resource to be displayed along the sliding direction of the rightward sliding operation. The first sub-resource may continue to be displayed, thereby terminating responding to the rightward sliding operation.

When the terminal device terminates responding to the sliding operation, the current sub-resource slides by a preset distance along the sliding direction of the sliding operation, and is reset to a position located by the current sub-resource before the sliding. The distance is smaller than a displaying length of the current sub-resource along the sliding direction in the displaying interface.

For example, the leftward sliding operation corresponds to the order of displaying from the first sub-resource to the last sub-resource in the first multimedia resource. The displaying interface of the terminal device currently displays the last sub-resource of the first multimedia resource. For the leftward sliding operation on the last sub-resource, it is determined that the first multimedia resource has no sub-resource to be displayed along the sliding direction of the leftward sliding operation. The last sub-resource may slide to left by the distance, and then slide to the right to reset the last sub-resource to the position located by the last sub-resource before the sliding.

Through sliding the sub-resource by the distance along the sliding direction, and resetting the sub-resource to the position located by the sub-resource before the sliding, the displaying interface reflects the user's sliding operation, and terminating the responding to the sliding operation may be realized.

In the embodiments, when the first multimedia resource has no sub-resource to be displayed along the sliding direction of the sliding operation, the terminal device may terminate the response of the current sub-resource of the first multimedia resource to the sliding operation along the sliding direction, thereby implementing the damping interaction and preventing the sliding operation along the sliding direction from continuing.

At block 103, the terminal device can obtain a second multimedia resource in response to a switching instruction, in which the second multimedia resource is associated with the first multimedia resource.

After terminating the responding to the sliding operation, the terminal device receives a switching instruction. The terminal device may obtain the second multimedia resource associated with the first multimedia resource in response to the switching instruction. The second multimedia resource may have the same type as the first multimedia resource. Or the second multimedia resource is a multimedia resource about the same object as the first multimedia resource. The second multimedia resource may be an album, a video, or a single picture, etc.

In the embodiments, when another sliding operation along the sliding direction on the sub-resource is obtained, it may be considered that the switching instruction is received. For example, if the leftward sliding operation on the last sub-resource is obtained, there is no sub-resource to be displayed along the leftward direction of the leftward sliding operation. If the leftward sliding operation on the last sub-resource is obtained again, the second multimedia resource associated with the first multimedia resource may be obtained.

In some embodiments, for the sub-resource for which there is no sub-resource to be displayed along the sliding direction of the sliding operation, there is a control for switching among multimedia resources on the displaying interface of the leftward. When a selecting operation on the control is obtained (i.e., the control is triggered), it may be considered that the switching instruction is received. For example, if a rightward sliding operation on the first sub-resource is obtained, the first multimedia resource has no sub-resource to be displayed along the sliding direction of the rightward sliding operation, and the displaying interface where the sub-resource is located has a control for switching among multimedia resources. When the selecting operation on the control is obtained, the second multimedia resource associated with the first multimedia resource is obtained.

It should be noted that the position of the control on the displaying interface may be set as required, which is not limited in the embodiments of the disclosure.

Figure 2:
FIG. 2 is a schematic diagram illustrating a displaying interface of a terminal according to some embodiments of the disclosure.
Figure 3:
FIG. 3 is a schematic diagram illustrating a displaying interface of a terminal according to some embodiments of the disclosure.

FIG. 2 is a schematic diagram illustrating a displaying interface of a terminal according to some embodiments of the disclosure. FIG. 3 is a schematic diagram illustrating a displaying interface of a terminal according to some embodiments of the disclosure. FIG. 2 and FIG. 3 are based on an album as examples. The pictures illustrated in FIG. 2 and FIG. 3 belong to the same album. In FIG. 2, the displaying interface 210 of the terminal device currently displays the first picture in a certain album, that is, the starting picture of the album. The displaying interface 210 displays "1/13" indicating that there are 13 pictures in the album, and the first picture in the album is currently displayed. The rightward sliding operation on the first picture may be obtained, and the corresponding sliding direction is right. At this time, there is no picture to be viewed in the album. If the rightward sliding operation on the first picture may be obtained again, other albums or videos associated with the album may be obtained.

In addition, the displaying interface 210 in FIG. 2 also includes a closing control 211. The currently displayed starting picture may be closed by clicking the closing control 211. It is understandable that the closing control 211 may be displayed on the displaying interface of each picture, so that the user may close the currently browsed picture at any time while browsing the album.

In FIG. 3, the displaying interface 210 of the terminal displays the last picture in the album. When the leftward sliding operation on the last picture is obtained again, another multimedia resource may be switched to display. In addition, the prompt message "this is the last one" is displayed on the last picture, and "13/13" is displayed on the displaying interface 210. It can also be seen that there are 13 pictures in the album and the 13$^{th}$ picture in the album is displayed.

In step 104, the terminal device can display the second multimedia resource.

After obtaining the second multimedia resource, the second multimedia resource is displayed on the displaying interface of the terminal. Since the second multimedia resource is different from the first multimedia resource, it may realize switching from the first multimedia resource to the second multimedia resource.

With the method in embodiments of the disclosure, for the sliding operation on each sub-resource of the first multimedia resource, when the first multimedia resource has no sub-resource to be displayed along the sliding direction of the sliding operation, and the switching instruction is received, another multimedia resource is displayed. The above-mentioned method may simplify the operation path of switching among multimedia resources, form a continuous video switching experience, and realize fast switching among multimedia resources.

Figure 4:
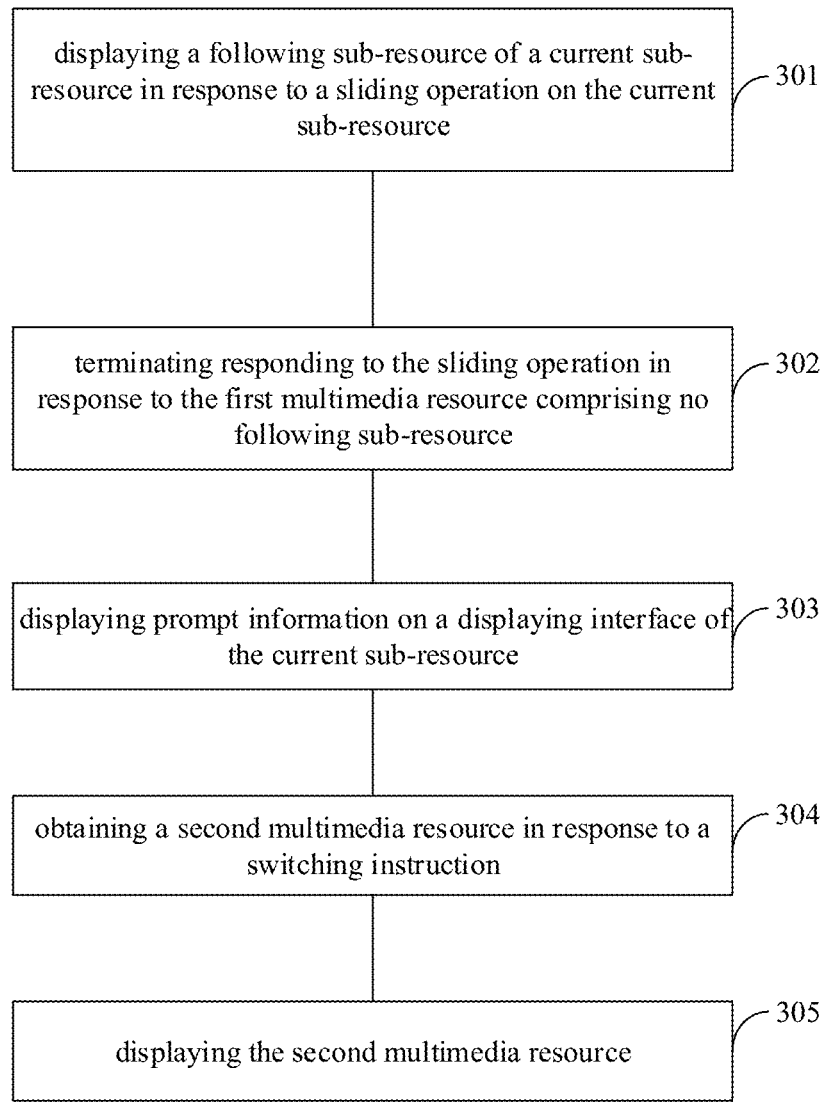
FIG. 4 is a flowchart illustrating a method for switching among multimedia resources according to some embodiments of the disclosure.

In some embodiments of the disclosure, the displaying interface of the terminal may display prompt information to facilitate the user to follow the prompt information to perform the sliding operation to switch among multimedia resources. It will be described below with reference to FIG. 4. FIG. 4 is a flowchart illustrating a method for switching among multimedia resources according to some embodiments of the disclosure.

As illustrated in FIG. 4, the method includes the following.

At block 301, the terminal device can display a following sub-resource of a current sub-resource in response to a sliding operation on the current sub-resource, in which the following sub-resource is adjacent to the current sub-resource and is to be displayed along a sliding direction of the sliding operation, and the current sub-resource and the following sub-resource are included in a first multimedia resource.

At block 302, the terminal device can terminate responding to the sliding operation in response to the first multimedia resource including no following sub-resource.

In the embodiments, actions at blocks 301 and 302 are similar to actions at above blocks 101 and 102, which are not be repeated herein.

At block 303, the terminal device can display prompt information on a displaying interface of the current sub-resource.

In some embodiments, the prompt information may be displayed in a preset region of the displaying interface of the current sub-resource. The preset region herein may be specified as needed, such as the right region or the left region on the displaying interface. The prompt information is configured to indicate that the switching instruction is triggered in response to another sliding operation on the current sub-resource along the sliding direction For example, the first multimedia resource is an album. For the rightward sliding operation on the first picture in the album, there is no picture to be displayed along the sliding direction of the rightward sliding operation, and the prompt information "sliding rightward to switch to the previous work" may be displayed on the displaying interface of the first picture. For the leftward sliding operation on the last picture in the album, there is no picture to be displayed along the sliding direction of the leftward sliding operation, and the prompt information "sliding leftward to switch to the next work" may be displayed on the displaying interface of the last picture.

Figure 5:
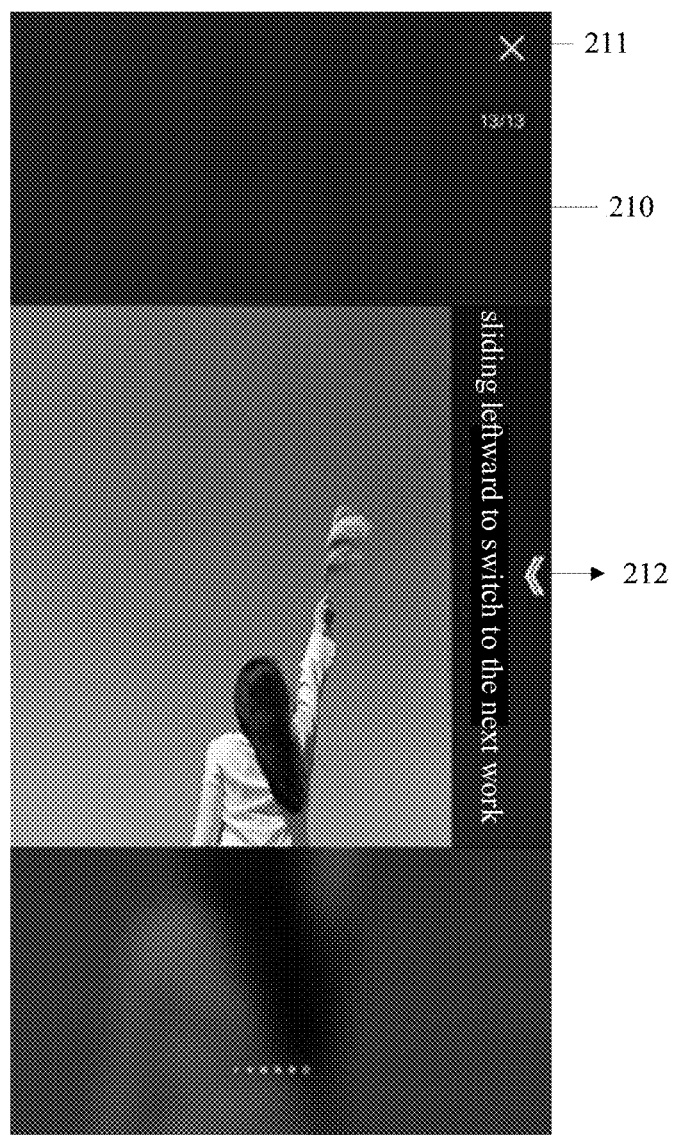
FIG. 5 is a schematic diagram illustrating a displaying interface of a terminal according to some embodiments of the disclosure.

FIG. 5 is a schematic diagram illustrating a displaying interface of a terminal according to some embodiments of the disclosure. In FIG. 5, the current displaying interface 210 displays the last picture in the album, this is, the 13$^{th}$ picture. In the right region of the displaying interface 210, the prompt information "sliding leftward to switch to the next work" is displayed. The prompt information also includes a left-sliding icon 212.

At block 304, the terminal device can obtain a second multimedia resource in response to a switching instruction, in which the second multimedia resource is associated with the first multimedia resource.

In the embodiments, if the user continues another sliding operation on the displaying interface, and the direction of this sliding operation is the same as the direction of the sliding operation corresponding to the determination that there is no sub-resource to be displayed, the terminal device receives the switching instruction, and the second multimedia resource associated with the first multimedia resource is obtained in response to the switching instruction. The second multimedia resource may have the same type as the first multimedia resource. Or the second multimedia resource is a multimedia resource about the same object as the first multimedia resource. The second multimedia resource may be an album, a video, or a single picture, etc.

In block 305, the terminal device can display the second multimedia resource.

After obtaining the second multimedia resource, the second multimedia resource is displayed on the displaying interface of the terminal. For example, if the second multimedia resource is a video, the video can be played.

In the embodiments, before responding to the switching instruction, the prompt information is displayed on the displaying interface of the current sub-resource. The prompt information is configured to indicate that the switching instruction is triggered in response to another sliding operation on the current sub-resource along the sliding direction. Therefore, before another multimedia resource is displayed, the prompt information for indicating to open another multimedia resource is displayed on the displaying interface to prompt the user, so that the user may operate based on the prompt information and realize the switching among multimedia resources.

In embodiments of the disclosure, the terminal device can terminate responding to the sliding operation, which is possible that the user has already browsed the multimedia resource. After terminating responding to the sliding operation, an interactive control may also be displayed on the displaying interface of the current sub-resource. The interactive control may be a comment control, a like control, a forward control and the like. Therefore, the user may interact through the interactive control in the process of browsing the sub-resources of the multimedia resource.

For example, if the leftward sliding operation on the last sub-resource of the first multimedia resource is obtained, the first multimedia resource has no sub-resource to be displayed along the sliding direction of the leftward sliding operation. Then the terminal device can terminate responding to the sliding operation. After the terminating responding to the sliding operation, the interactive control such as the comment control, the like control, the forward control and others may be displayed on the displaying interface of the last sub-resource. Through these interactive controls, the user may like, comment, forward, and others on the sub-resource or the multimedia resource.

In embodiments of the disclosure, after the terminating responding to the sliding operation, the interactive control may be displayed on the displaying interface of the current sub-resource, so that the user may interact with the multimedia resource through the control. In some embodiments, the above-mentioned method can improve the interactivity while satisfying immersive browsing.

In some embodiments of the disclosure, the second multimedia resource may be an album. When the second multimedia resource is displayed on the displaying interface of the terminal device, a starting picture or a cover picture of the second multimedia resource is displayed on the displaying interface of the terminal device.

In detail, the sliding operation on the current sub-resource in the first multimedia resource is obtained, and the first multimedia resource has no sub-resource to be displayed along the sliding direction of the sliding operation. The current sub-resources of the first multimedia resource is terminated for responding to the sliding operation along the sliding direction. The second multimedia resource associated with the first multimedia resource is obtained in response to the received switching instruction. The starting picture of the second multimedia resource is displayed on the displaying interface, so that users can directly browse the pictures in the album.

In some embodiments, the cover picture of the second multimedia resource may be displayed. The starting picture is entered by triggering an opening control displayed on the displaying interface of the cover picture. When the cover picture of the second multimedia resource is displayed, the cover picture may include description information of the second multimedia resource.

The description information herein may be edited and input as needed when the user publishes the album. For example, the description information may include the capturing location and moment of each picture in the album. For example, the pictures in the album were captured at a tourist attraction A, and the description information included in the cover picture of the album could be "check in at tourist attractions A, it's so beautiful".

In addition, the cover picture may also include other information such as the name of the publisher of the album, the name of the background music, and the like.

In embodiments of the disclosure, the second multimedia resource may be the album. When the second multimedia resource is displayed, the starting picture or the cover picture of the second multimedia resource may be displayed, in which the cover picture includes the description information of the second multimedia resource. Therefore, when the currently browsed multimedia resource has no sub-resource to be displayed along the sliding direction of the sliding operation, the starting picture or the cover picture of another album may be directly entered through the switching instruction. In some embodiments, the above-mentioned method simplify the user's operation on switching among albums, and improve the switching efficiency.

In the foregoing embodiments, the second multimedia resource is the album. In embodiments of the disclosure, the second multimedia resource may also be a video. Therefore, when the second multimedia resource is displayed on the displaying interface of the terminal device, the second multimedia resource may be played on the displaying interface of the terminal device.

The second multimedia resource may be a video captured by the user. Alternatively, the second multimedia resource may also be a video made from multiple pictures. When this type of video is played, each picture may be displayed for a duration, such as 2 seconds. It should be noted that the duration of each picture may be set as required, which is not limited in the disclosure.

In embodiments of the disclosure, the second multimedia resource may be the video. By obtaining the sliding operation on the current sub-resource of the first multimedia resource, the following sub-resource adjacent to the current sub-resource is displayed. If the first multimedia resource has no sub-resource to be displayed along the sliding direction of the sliding operation, the current sub-resources of the first multimedia resource are terminated to respond to the sliding operation along the sliding direction, and the second multimedia resource associated with the first multimedia resource is obtained in response to the switching instruction. The second multimedia resource is played. Thus, when the currently browsed multimedia resource has no sub-resource to be displayed along the sliding direction, the switching from the first multimedia resource to the video is realized by responding to the received switching instruction. In some embodiments, the above-mentioned method simplify the user's switching operation, achieve fast switching among multimedia resources, and improve the switching efficiency.

In embodiments of the disclosure, in the displaying interface, multimedia resources or sub-resources of multimedia resources may also be stored.

In detail, in the process of browsing the first multimedia resource, when the terminal device receives a storing instruction, the first multimedia resource or the sub-resource may be stored in response to the storing instruction.

In the embodiments, when the storing instruction on the first multimedia resource or the sub-resource is obtained, it may be considered that the storing instruction is received. For example, if the user performs a long-press operation on the displaying interface, the displaying interface can pop up an option of saving the first multimedia resource and an option of saving the current sub-resource. Based on the user's selection operation, the content to be saved may be determined and then stored. For example, the user selects to save the current sub-resource, the current sub-resource is stored.

In some embodiments, a saving control is displayed on the displaying interface, and the saving control is configured to store the first multimedia resource or the sub-resource. For example, when the trigger operation on the saving control is obtained, the option for saving the first multimedia resource and the option for saving the current sub-resource will pop up on the displaying interface. Based on the user's selection operation, the content to be saved may be determined and then stored. For example, the user selects to save the first multimedia resource, the first multimedia resource is stored.

In embodiments of the disclosure, the first multimedia resource or the sub-resource may be stored in response to the storing instruction. Therefore, the users may save the multimedia resource or one or more sub-resources in the multimedia resource as needed.

In embodiments of the disclosure, when obtaining the second multimedia resource, other multimedia resource owned by the account to which the first multimedia resource belongs may be recommended to the users as the second multimedia resource.

In detail, the account to which the first multimedia resource belongs may be determined based on a corresponding relationship between multimedia resources and accounts to which the multimedia resources belong. Multiple multimedia resources owned by this account are obtained, and the second multimedia resource is selected from the multiple multimedia resources. The selected second multimedia resource is displayed.

In applications, when the user browses multimedia resources, he/she may be more interested in multimedia resources of the same account as the currently browned multimedia resource. Then, when the user's sliding operation on the sub-resource in the multimedia resource satisfies the switching condition, one of other multimedia resources owned by the account to which the current multimedia resource belongs is displayed on the displaying interface of the terminal device.

For example, the user currently browses an album. The account to which the currently browsed album belongs is a. When the user slides to the right on the displaying interface of the first picture in the album, and there is no picture to be displayed in the album along the direction of sliding to the right, the pictures in the album are terminated to respond to the sliding operation along the sliding direction. Other multimedia resources of account a may be obtained in response to receiving the switching instruction, and one of other multimedia resources of account a may be selected to display, so that the user may browse the multimedia resources of the same account.

In embodiments of the disclosure, when obtaining the second multimedia resource, the multiple multimedia resources owned by the account to which the first multimedia resource belongs, may be obtained. One of the multiple multimedia resources may be selected as the second multimedia resource. As a result, when the user's sliding operation on the sub-resource of the currently browsed multimedia resource satisfies the switching condition, it may switch to other multimedia resource owned by the account to which the currently browsed multimedia resource belongs, thereby recommending other multimedia resources of the same account to the user, and satisfying the browsing needs of the user.

The foregoing embodiments describes that other multimedia resources owned by the account to which the first multimedia resource belongs may be recommended to the user. In embodiments of the disclosure, when obtaining the second multimedia resource, multimedia resources of the same category (or type) as the first multimedia resource may also be recommended to the user.

In detail, multiple categories may be preset, for example, food, travel, fitness, news, etc. The category to which each multimedia resource belongs is determined when the corresponding multimedia resource is published.

When obtaining the second multimedia resource, the category to which the first multimedia resource belongs may be determined based on the description information of the cover picture of the first multimedia resource, or based on the attribute of the category to which the first multimedia resource belongs. Then, based on the category to which the first multimedia resource belongs, multiple multimedia resources included in this category are obtained, and one of the multiple multimedia resources is selected as the second multimedia resource, and finally displayed on the displaying interface of the terminal device.

In applications, the user may be interested in the same category of multimedia resources. Therefore, when the user's sliding operation on the picture in the multimedia resource satisfies the switching condition, one of other multimedia resources belonging to the same category as the first multimedia resource may be selected and displayed, so that when the multimedia resources are switched, the same category of multimedia resources are recommended to the user.

In embodiments of the disclosure, when obtaining the second multimedia resource, the multiple multimedia resources included in the category to which the first multimedia resource belongs are obtained, and one of the multiple multimedia resources included in the category to which the first multimedia resource belongs may be selected as the second multimedia resource. Therefore, when the user slides the sub-resource of the currently browsed multimedia resource to satisfy the switching condition, he/she may switch to other multimedia resource in the category to which the currently browsed multimedia resource belongs, so as to realize the recommendation of the same category of the multimedia resource to the user, and satisfy the browsing needs of the user.

In embodiments of the disclosure, under a case that the sub-resource is a cover picture of the first multimedia resource, after obtaining the sliding operation on the sub-resource included in the first multimedia resource, cover pictures of a multiple multimedia resources associated with the first multimedia resource may be displayed on the displaying interface of the terminal, so that the user can select the multimedia resource of interest based on the cover picture of each multimedia resource.

Figure 6:
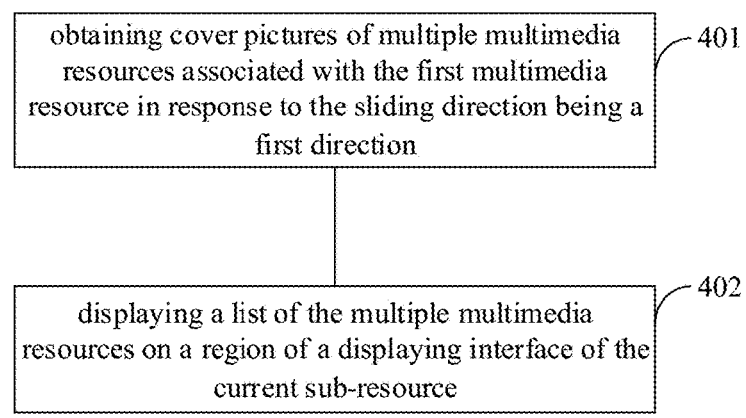
FIG. 6 is a flowchart illustrating a method for switching among multimedia resources according to some embodiments of the disclosure.

This will be described with reference to FIG. 6. FIG. 6 is a flowchart illustrating a method for switching among multimedia resources according to some embodiments of the disclosure. As illustrated in FIG. 6, the method includes the following.

At block 401, the terminal device can obtain cover pictures of multiple multimedia resources associated with the first multimedia resource in response to the sliding direction of the sliding operation being a first direction.

In some embodiments, if the displaying interface of the terminal device currently displays the cover picture of the first multimedia resource, and the user performs the sliding operation on the displaying interface of the cover picture of the first multimedia resource, and the direction of the sliding operation is the first preset direction, the cover pictures of the multiple multimedia resources associated with the first multimedia resource are obtained.

For example, on the displaying interface of the cover picture of the first multimedia resource, the user slides to the right to obtain the cover picture of each multimedia resource associated with the first multimedia resource.

It should be noted that each multimedia resource associated with the first multimedia resource in the embodiments may be owned by the account to which the first multimedia resource belongs, or may belong to the same category as the first multimedia resource, which is described in the above-mentioned embodiments. Or, each multimedia resource associated with the first multimedia resource may be a pre-established multimedia resource that has an association relationship with the first multimedia resource.

At block 402, the terminal device can display a list of the multiple multimedia resources on a region of a displaying interface of the current sub-resource, in which the list includes the cover pictures of the first multimedia resource and the multiple multimedia resources.

After obtaining the cover picture of each multimedia resource associated with the first multimedia resource, the list of multimedia resources may be displayed in the preset region of the current displaying interface, that is, the preset region of the displaying interface of the cover picture of the first multimedia resource.

The list may include the cover picture of the first multimedia resource and the cover picture of each associated multimedia resource. In the displaying interface, the cover picture of the first multimedia resource and the cover pictures of the associated multimedia resources may be displayed in the form of list. The cover picture of the first multimedia resource may be displayed at the top of the list. The order of displaying the cover pictures of the associated multimedia resources may be randomly determined, or may be determined based on a reading volume of each associated multimedia resource, for example, the more reading volume, the display is closer to the front.

The preset region herein may be set based on needs, for example, it may be the left region, or right region, or upper region, or lower region of the displaying interface.

For example, if the first preset direction is right, and when a rightward sliding operation on the displaying interface of the cover picture of the first multimedia resource is obtained, the right region of the displaying interface may be used for displaying the list. if the first preset direction is left, and when a leftward sliding operation on the displaying interface of the cover picture of the first multimedia resource is obtained, the left region of the displaying interface may be used for displaying the list.

Figure 7:
FIG. 7 is a schematic diagram illustrating a process of displaying a list of multimedia resources according to some embodiments of the disclosure.

FIG. 7 is a schematic diagram illustrating a process of displaying a list of multimedia resources according to some embodiments of the disclosure.

The displaying interface 210 illustrated on the left of FIG. 7 may show a cover picture of a certain album, the description information "Sky Photo Album! It is beautiful, don't miss it!" of the cover picture of the album, an avatar of the account to which the album belongs, and the account name "MiaoMiaoOn". If it slides to the left on this displaying interface 210, the displaying interface 210 on the right of FIG. 7 may be obtained, and the displaying interface 210 on the right of FIG. 7 may display a list including the cover picture of the currently browsed album and the cover picture of each multimedia resource associated with the current album. The cover picture of the currently browsed album is at the top of the list.

On the right of FIG. 7, the list is a list of works of the account "MiaoMiaoOn to which the currently browsed album belongs, and the name of the list is "Her Works". The list shows that the list contains 100 works, and the "Follow" button also displayed on the displaying interface 210.

In addition, the publishing time of the currently browsed album may be displayed on the displaying interface of the cover picture of the currently browsed album as shown on the upper left corner of the displaying interface 210 on the left in FIG. 7, such as "one month ago", which shows that the currently displayed cover picture was published a month ago.

In embodiments of the disclosure, the sub-resource is a cover picture of the first multimedia resource. After obtaining the sliding operation on the sub-resource (i.e., the cover picture) of the first multimedia resource, if the sliding direction of the sliding operation is the first direction, the cover pictures of the multiple multimedia resources associated with the first multimedia resource may be obtained, and the list of the multiple multimedia resources may be displayed on the region of the displaying interface of the sub-resource. The list includes the cover pictures of the first multimedia resource and the multiple multimedia resources. Therefore, by sliding along the preset direction on the cover picture of the first multimedia resource, the list may be displayed, so that the user may select the multimedia resource of interest based on the list.

Figure 8:
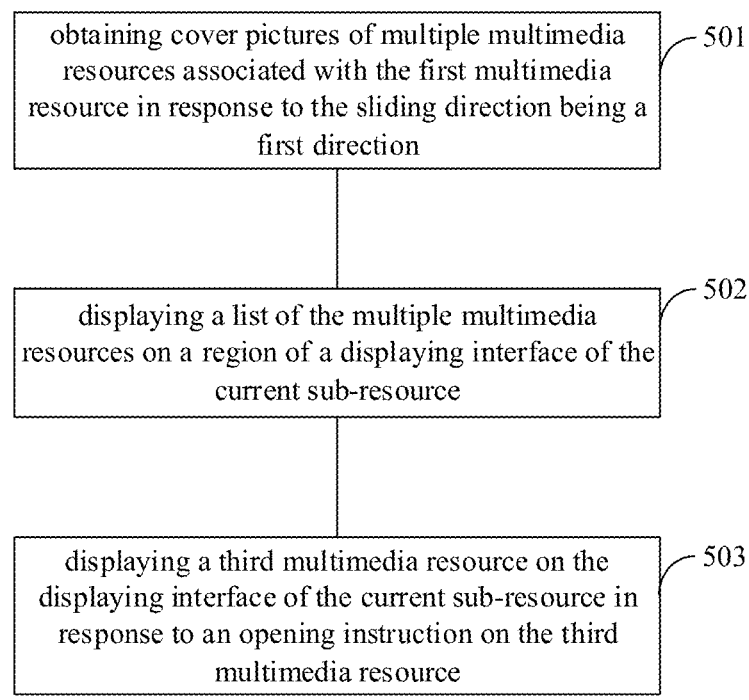
FIG. 8 is a flowchart illustrating a method for switching among multimedia resources according to some embodiments of the disclosure.

In some embodiments of the disclosure, after the list of multimedia resources is displayed on the region of the displaying interface of the sub-resource, a third multimedia resource is displayed on the displaying interface in response to the opening instruction on the third multimedia resource. The third multimedia resource is a multimedia resource in the list. It will be described below with reference to FIG. 8. FIG. 8 is a flowchart illustrating a method for switching among multimedia resources according to some embodiments of the disclosure.

As illustrated in FIG. 8, the method may include the following.

At block 501, the terminal device can obtain cover pictures of multiple multimedia resources associated with the first multimedia resource in response to the sliding direction of the sliding operation being a first direction.

At block 502, the terminal device can display a list of the multiple multimedia resources on a region of a displaying interface of the current sub-resource, in which the list includes the cover pictures of the first multimedia resource and the multiple multimedia resources.

In the embodiments, actions at blocks 501 and 502 are similar to actions at block 401 and 402, which are not be repeated herein.

At block 503, the terminal device can display a third multimedia resource on the displaying interface of the current sub-resource in response to an opening instruction on the third multimedia resource.

In the embodiments, if the preset region of the displaying interface of the cover picture of the first multimedia resource displays the list of multimedia resources, the user may click any multimedia resource in the list to switch, and the terminal device receives the opening instruction on the third multimedia resource. The third multimedia resource may be displayed on the displaying interface of the terminal device in response to the opening instruction.

When displaying the third multimedia resource, if the third multimedia resource is an album, the displaying interface of the terminal device may change from displaying the cover picture of the first multimedia resource to displaying the cover picture of the third multimedia resource or the starting picture of the third multimedia resource. If the third multimedia resource is a video, the displaying interface of the terminal device may be changed from displaying the cover picture of the first multimedia resource to playing the third multimedia resource.

For example, the terminal currently displays the cover picture of the album M, and the right region of the displaying interface of the terminal displays the cover picture of the album M and the cover pictures of multimedia resources associated with the album M. If the user clicks on the cover picture of the album N, the terminal can switch from displaying the cover picture of the album M to displaying the cover picture of the album N.

If the displaying interface of the terminal device displays the cover picture of the multimedia resource, the first sub-resource of the multimedia resource may be displayed through the control of opening the multimedia resource, in which the control is set on the displaying interface. Taking the album as an example. The control for opening the album may be displayed on the displaying interface of the cover picture of the album. If the user triggers the control, the terminal can obtain the opening request, and then display the starting picture of the album based on the opening request. The starting picture of the album is the first picture of the album. As a result, based on the opening request of the album, the first picture of the album may be directly entered.

As illustrated at the right of FIG. 7, the displaying interface 210 of the terminal device displays a cover picture of a certain album, and a "click to open the album" button 212 is displayed on the displaying interface 210. When the user clicks the button, the starting picture of the album is displayed on the displaying interface 210, as illustrated in FIG. 2, so that the user can browse the pictures in the album by sliding left or right.

In addition, in the case that the displaying interface of the cover picture of the album does not display the list of multimedia resources, the control of opening the album may also be displayed on the displaying interface. As illustrated in the left of FIG. 7, the displaying interface of the cover picture of the album also displays a "click to open the album" button 212. The user may directly click this button to display the starting picture of the album on the displaying interface.

After the displaying interface of the terminal device displays the starting picture of the album, the user may browse the pictures following the starting picture successively through the sliding operations, such as the second picture, the third picture until the last picture.

In embodiments of the disclosure, after the list is displayed on the preset region of the displaying interface of the sub-resource, the third multimedia resource is displayed on the displaying interface of the sub-resource (i.e., the region located by the sub-resource) in response to the opening instruction on the third multimedia resource. Thus, by using the list of multimedia resources, the user can directly select the multimedia resource that he/she wants to browse, so that the terminal device may directly switch to the multimedia resource selected by the user. The operation path is simple, and the switching speed and switching efficiency are greatly improved.

Further, in embodiments of the disclosure, after the third multimedia resource is displayed on the displaying region of the sub-resource, the cover picture of the third multimedia resource in the list is displayed in the selected state.

In the embodiments, after the cover picture of the third multimedia resource is displayed on the displaying interface of the terminal device based on the opening instruction on the third multimedia resource, the cover picture of the third multimedia resource in the list is displayed as the selected state to distinguish it from other multimedia resources in the list.

The selected state herein can be to add a border to the cover picture of the third multimedia resource in the list, or to expand the displaying region of the cover picture of the third multimedia resource in the list. Of course, other ways can also be used to indicate that the cover picture of the third multimedia resource in the list is in the selected state, which is not limited in embodiments of the disclosure.

It should be noted that the list of multimedia resources may include the cover picture of the video. If the user selects the cover picture of the video, the cover picture of the video in the list is displayed as a selected state. The cover picture of the video in the list may be the first frame of the video, or a randomly selected frame of image, or an image of the person who appears most frequently in the video, and so on.

Figure 9:
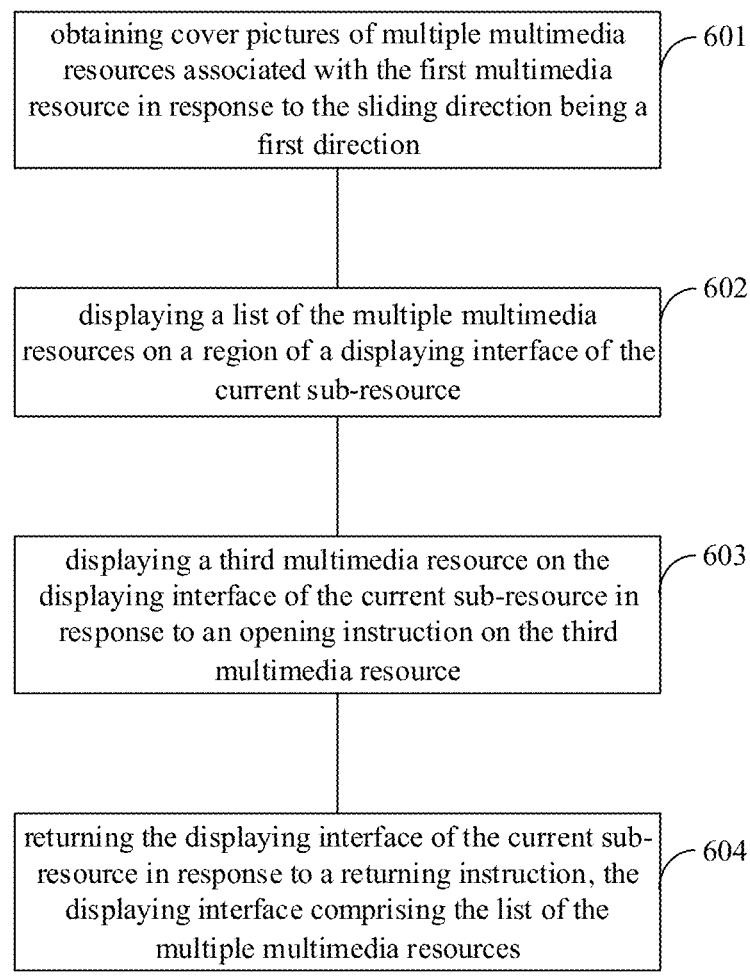
FIG. 9 is a flowchart illustrating a method for switching among multimedia resources according to some embodiments of the disclosure.

In embodiments of the disclosure, after the third multimedia resource is displayed on the display region of the sub-resource, the third multimedia resource may also be returned based on a returning instruction. The returned displaying interface includes the list of the multiple multimedia resources. The following will describe with reference to FIG. 9. FIG. 9 is a flowchart illustrating a method for switching among multimedia resources according to some embodiments of the disclosure.

As illustrated in FIG. 9, the method includes the following.

At block 601, the terminal device can obtain cover pictures of multiple multimedia resources associated with the first multimedia resource in response to the sliding direction of the sliding operation being a first direction.

At block 602, the terminal device can display a list of the multiple multimedia resources on a region of a displaying interface of the current sub-resource, in which the list includes the cover pictures of the first multimedia resource and the multiple multimedia resources.

At block 603, the terminal device can display a third multimedia resource on the displaying interface of the current sub-resource in response to an opening instruction on the third multimedia resource.

In the embodiments, actions at blocks 601, 602 and 603 are similar to actions at block 501, 502 and 503, which are not be repeated herein.

At block 604, the terminal device can returned to the displaying interface of the current sub-resource in response to a returning instruction, the displaying interface including the list of the multiple multimedia resources.

In the embodiments, the list of multimedia resources may be displayed on the displaying interface located by the cover picture of the first multimedia resource (i.e., the displaying interface of the cover picture of the first multimedia resource) through the sliding operation, and the third multimedia resource in the list may also be opened. When browsing the third multimedia resource, if the terminal device receives the returning instruction on the third multimedia resource, it returns to the displaying interface of the sub-resource in response to the returning instruction, in which the returned displaying interface includes the list of multimedia resources, that is, the displaying interface includes the list of multimedia resources before opening the third multimedia resource is returned.

In detail, if the third multimedia resource is a video, after the third multimedia resource has been played, the displaying interface located by the cover picture of the first multimedia resource may be returned in response to the returning instruction, in which the returned displaying interface includes the list of multimedia resources. If the third multimedia resource is an album, in the process of browsing this album, the user may close the picture in the album through the closing control on the displaying interface located by the picture in the album or click any area on the displaying interface located by the picture in the album, and the terminal device will receive the returning instruction. The displaying interface located by the cover picture of the first multimedia resource may be returned in response to the received returning instruction, in which the returned displaying interface includes the list of multimedia resources.

Taking FIGS. 2 and 3 as examples. The pictures illustrated in FIGS. 2 and 3 are the first picture and the last picture in the album to which the cover picture displayed by the terminal in FIG. 7 belongs, respectively. In FIGS. 2 and 3, a closing control 211 is displayed in the upper right corner of the displaying interface 210. When the user clicks the closing control 211, the user returns to the displaying interface of the terminal illustrated in the right of FIG. 7.

That is, the third multimedia resource may be entered or opened through the list, and the displaying interface containing the list may be returned again when the returning instruction on the third multimedia resource is received.

In embodiments of the disclosure, after displaying the third multimedia resource in the displaying region of the sub-resource, the displaying interface of the sub-resource, which contains the list of multimedia resources may be returned in response to the returning instruction on the third multimedia resource. Therefore, if the multimedia resource is entered or opened through the displaying interface containing the list, during the process of browsing the opened or entered multimedia resource, the displaying interface containing the list is returned directly when the returning instruction is received, so that the list may be used to conveniently browse the multimedia resources. In some embodiments, the above-mentioned method may improve the efficiency of switching among multimedia resources and the efficiency of browsing multimedia resources.

In some embodiments, after opening or entering the third multimedia resource using the list, when switching among the multimedia resources during the process of browsing the third multimedia resource, the multimedia resource adjacent to the third multimedia resource in the list may be switched to.

In detail, after the third multimedia resource is displayed in the displaying region of the sub-resource of the first multimedia resource, a sliding operation on a sub-resource included in the third multimedia resource is obtained. If the third multimedia resource does not include a following sub-resource being to be displayed along a sliding direction of the sliding operation, a fourth multimedia resource adjacent to the third multimedia resource is obtained from the list based on the sliding direction of this sliding operation. The fourth multimedia resource is displayed. Also, the cover picture of the fourth multimedia resource in the list is in the selected state.

The fourth multimedia resource may be an album, video, etc. If the fourth multimedia resource is the album, a starting picture or a cover picture of the fourth multimedia resource is displayed. If the fourth multimedia resource is the video, the fourth multimedia resource is played. In this way, multiple types of multimedia resources may be switched to.

In the embodiments, when another sliding operation along the sliding direction is obtained, it can be considered that the switching instruction is received. That is, if the third multimedia resource has no sub-resources to be displayed along the sliding direction of the sliding operation, and a second sliding operation along the sliding direction is received, the fourth multimedia resource is obtained from the list according to the sliding direction. The fourth multimedia resource is adjacent to the multimedia resource.

The sliding direction of the sliding operation corresponds to the order of displaying the sub-resources in the multimedia resource, and the order of switching among the multimedia resources in the list.

In some embodiments, the leftward sliding operation corresponds to the order of displaying from the first sub-resource to the last sub-resource in the multimedia resource, and corresponds to the order of switching from the first multimedia resource to the last multimedia resource in the list. The rightward sliding operation corresponds to the order of displaying from the last sub-resource to the first sub-resource in the multimedia resource, and corresponds to the order of switching from the last multimedia resource to the first multimedia resource in the list. When the sliding operation on the sub-resource included in the third multimedia resource is the leftward sliding operation, the third multimedia resource does not include the following sub-resource being to be displayed along the sliding direction of the leftward sliding operation, and the second leftward sliding operation is received, the next multimedia resource adjacent to the third multimedia resource may be obtained from the list, and is displayed. When the sliding operation on the sub-resource included in the third multimedia resource is the rightward sliding operation, the third multimedia resource does not include the following sub-resource being to be displayed along the sliding direction of the rightward sliding operation, and the second rightward sliding operation is received, the previous multimedia resource adjacent to the third multimedia resource may be obtained from the list, and is displayed. For example, the cover picture of the album X is displayed on the displaying interface of the terminal, and a list of multimedia resources is also displayed on the displaying interface of the terminal. In the list, the album which is adjacent to the album X and previous to the album X is the album Y The user slides to the right on the current displaying interface. Since there is no picture before the starting picture in the album X, if the rightward sliding operation again is obtained, the displaying interface of the terminal can display the album Y.

In embodiments of the disclosure, after the third multimedia resource is displayed on the displaying region of the sub-resource, if the sliding operation on the sub-resource included in the third multimedia resource is obtained from the displaying interface of the sub-resource included in the third multimedia resource and the third multimedia resource does not include the following sub-resource being to be displayed along the sliding direction of the sliding operation, the fourth multimedia resource is obtained from the list based on the sliding direction of the sliding operation in response to the switching instruction. The fourth multimedia resource is adjacent to the third multimedia resource and the fourth multimedia resource is displayed. Therefore, after the multimedia resource is opened through the interface that contains the list, when the resource is switched in the process of browsing the multimedia resource, it is switched to the next multimedia resource or the previous multimedia resource in the list, so that the user can know to switch to the multimedia resource.

In embodiments of the disclosure, after the list is displayed on the region of the displaying interface located by the sub-resource of the first multimedia resource, the list may be closed through a closing instruction on the list.

In some embodiments, the list can be closed by clicking on the non-operation region of the displaying interface. When the user clicks on the non-operation region of the displaying interface of the terminal, the terminal obtains a click operation and closes the list based on the click operation. The displaying interface of the terminal herein refers to the displaying interface that displays the list of multimedia resources, such as the displaying interface that contains the list of multimedia resources where the cover picture of the album is located. The non-operation region may refer to the region on the displaying interface except for the controls for opening the multimedia resources.

In some embodiments, a sliding operation along a preset direction may also be used to close the list. The sliding operation along the preset direction herein may be a sliding operation opposite to the first preset direction. For the convenience of distinguishing, it is referred to herein as the sliding operation along the second preset direction.

For example, if the user slides to the left on the displaying interface where the cover picture of the first multimedia resource is located, the terminal displays the list. The user may slide to the right on the displaying interface to close the list and make the list disappear from the displaying interface, and the list is not displayed on the displaying interface.

Alternatively, the user can also input a closing instruction by voice to close the list. For example, if the user inputs "close the list" by voice, the terminal closes the list based on the close instruction input by the user.

In the embodiments of the disclosure, after the list is displayed on the preset region of the displaying interface where the sub-resource is located, the list is closed in response to a closing instruction. As a result, the list can be closed through the sliding operation along the preset direction on the displaying interface or the click operation on the non-operation region on the displaying interface.

Figure 10:
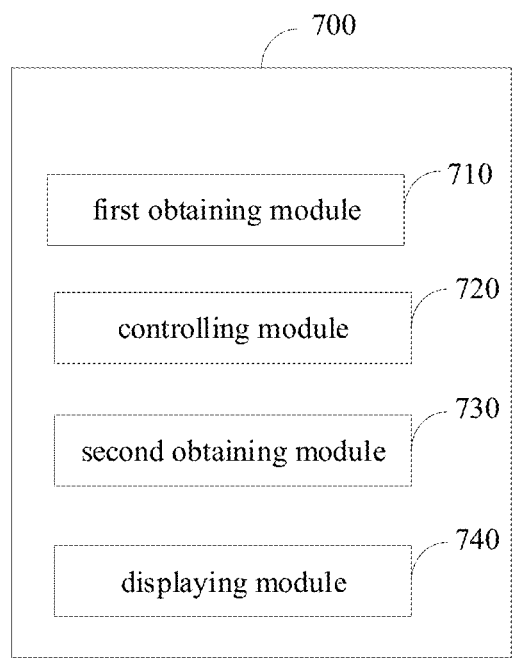
FIG. 10 is a block diagram illustrating an apparatus for switching among multimedia resources according to some embodiments of the disclosure.

FIG. 10 is a block diagram illustrating an apparatus for switching among multimedia resources according to some embodiments of the disclosure. As illustrated in FIG. 10, the apparatus 700 includes a first obtaining module 710, a controlling module 720, a second obtaining module 730, and a displaying module 740.

The first obtaining module 710 is configured to obtain a sliding operation on a sub-resource included in a first multimedia resource; and display a following sub-resource in response to the sliding operation under a case that the first multimedia resource comprises the following sub-resource, the following sub-resource being adjacent to the sub-resource and being to be displayed along a sliding direction of the sliding operation.

The controlling module 720 is configured to stop responding to the sliding operation under a case that the first multimedia resource does not comprise the following sub-resource.

The second obtaining module 730 is configured to obtain a second multimedia resource in response to a switching instruction, the second multimedia resource being associated with the first multimedia resource.

The displaying module 740 is configured to display the second multimedia resource.

In some embodiments, the switching instruction includes: another sliding operation on the sub-resource along the sliding direction; or a selecting operation on a control on a displaying interface of the sub-resource.

In some embodiments, the displaying module 740 is configured to display prompt information on a displaying interface of the sub-resource, the prompt information for indicating that the switching instruction is triggered in response to another sliding operation on the sub-resource along the sliding direction.

In some embodiments, the displaying module 740 is configured to display an interactive control on a displaying interface of the sub-resource.

In some embodiments, the second multimedia resource includes an album. The displaying module 740 is configured to display a starting picture or a cover picture of the second multimedia resource, the cover picture comprises description information of the second multimedia resource.

In some embodiments, the second multimedia resource includes a video. The displaying module 740 is configured to play the second multimedia resource.

In some embodiments, the apparatus further includes a storing module. The storing module is configured to store the first multimedia resource or the sub-resource in response to a storing instruction.

In some embodiments, the controlling module 720 is configured to slide the sub-resource by a distance along the sliding direction, and reset the sub-resource to a position located by the sub-resource before the sliding.

In some embodiments, the second obtaining module 730 may include: a first obtaining unit configured to obtain multiple multimedia resources, the multiple multimedia resources being owned by an account to which the first multimedia resource belongs; and a first selecting unit configured to select the second multimedia resource from the multiple multimedia resources.

In some embodiments, the second obtaining module 730 may include: a second obtaining unit configured to obtain multiple multimedia resources, the multiple multimedia resources belonging to the same category as the first multimedia resource; and a second selecting unit configured to select the second multimedia resource from the multiple multimedia resources.

In some embodiments, under a case that the sub-resource is a cover picture of the first multimedia resource, the apparatus further includes a third obtaining module configured to obtain cover pictures of multiple multimedia resources associated with the first multimedia resource in response to the sliding direction of the sliding operation being a first direction. The displaying module 740 is configured to display a list of the multiple multimedia resources on a region of a displaying interface of the sub-resource, the list including the cover pictures of the first multimedia resource and the multiple multimedia resources.

In some embodiments, the displaying module 740 is configured to display a third multimedia resource on the displaying interface of the sub-resource in response to an opening instruction on the third multimedia resource.

In some embodiments, the displaying module 740 is configured to display a cover picture of the third multimedia resource as a selected state.

In some embodiments, the apparatus further includes a returning module configured to return the displaying interface of the sub-resource in response to a returning instruction, the displaying interface including the list of the multiple multimedia resources.

In some embodiments, the apparatus further includes a fourth module configured to, under a case that a sliding operation on a sub-resource included in the third multimedia resource is obtained, and the third multimedia resource does not comprise a following sub-resource being to be displayed along a sliding direction of the sliding operation, obtain a fourth multimedia resource adjacent to the third multimedia resource from the list based on the sliding direction, in response to a switching instruction on the third multimedia resource.

The displaying module 740 is configured to display the fourth multimedia resource.

In some embodiments, the displaying module 740 is configured to, display a starting picture or a cover picture of the fourth multimedia resource under a case that the fourth multimedia resource comprises an album, or play the fourth multimedia resource under a case that the fourth multimedia resource comprises a video.

In some embodiments, the apparatus further includes a closing configured to, close the list in response to a closing instruction on the list.

In some embodiments, the closing instruction includes: a click operation on a non-operation region of the displaying interface of the sub-resource; or a sliding operation along a second direction on the displaying interface of the sub-resource.

Regarding the apparatus according to the foregoing embodiments, the specific manner in which each module performs operations has been described in detail in embodiments of the method, and thus detailed description will not be repeated here.

Figure 11:
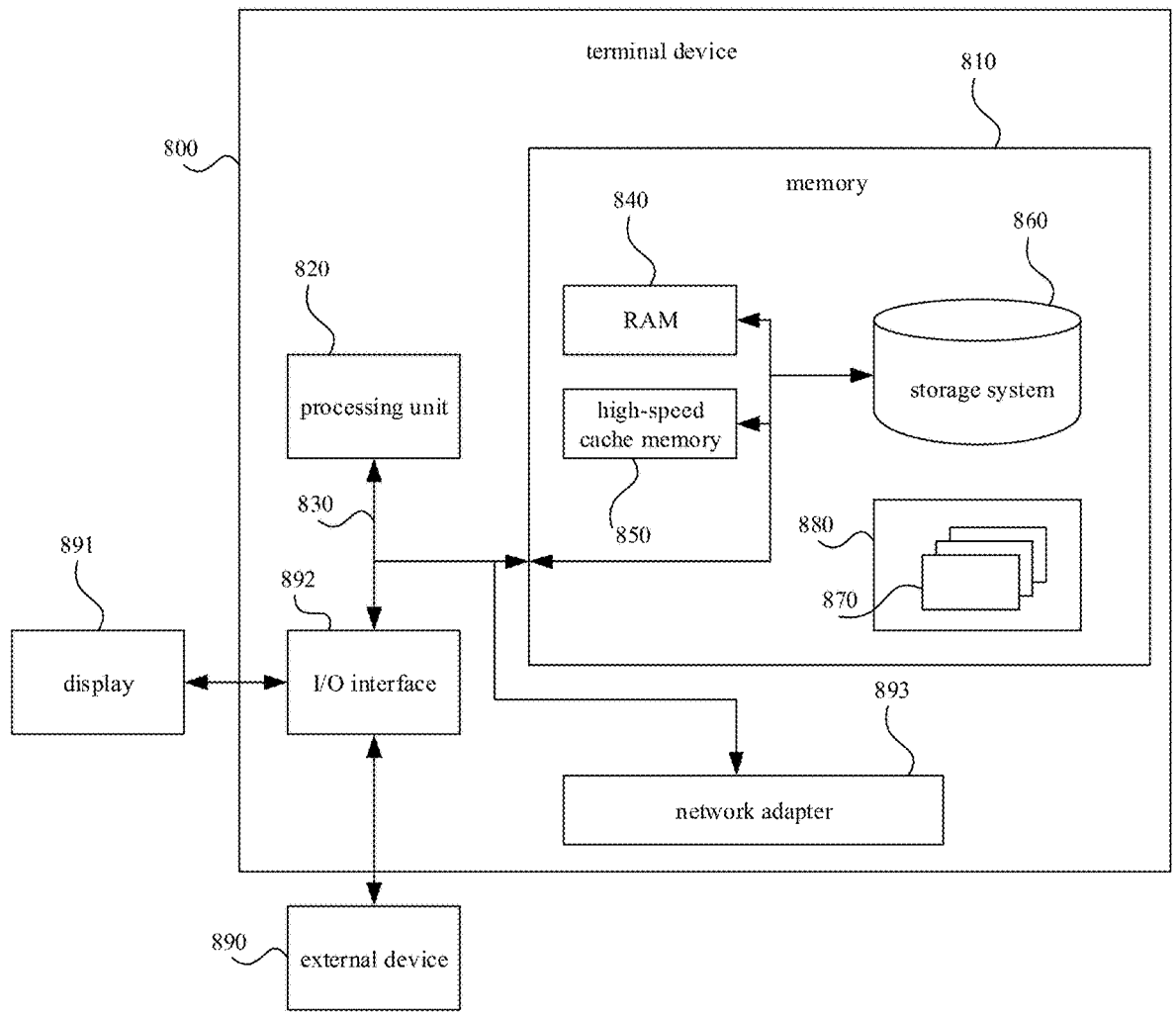
FIG. 11 is a block diagram illustrating an electronic device according to some embodiments of the disclosure.

FIG. 11 is a block diagram illustrating an electronic device 800 according to some embodiments.

The terminal device 800 illustrated in FIG. 11 may include a memory 810, a processing unit 820, and a bus 830 connecting various system components including the memory 810 and the processing units 820. The memory 810 has stored executable instructions. The processing units 820 is configured to execute instructions to carry out the above method.

The bus 820 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The terminal device 800 typically includes a variety of readable media. These media may be any available media accessible by the terminal device 800 and includes both volatile and non-volatile media, removable and non-removable media.

The memory 810 may include a computer system readable medium in the form of volatile memory, such as a random-access memory (hereinafter referred to as RAM) 840 and/or a high-speed cache memory 850. The device 800 may further include other removable or non-removable, volatile or non-volatile computer system storage media. By way of example only, the storage system 860 may be configured to read and write a non-removable and non-volatile magnetic media (not illustrated in FIG. 11, commonly referred to as a "hard drive"). Although not illustrated in FIG. 11, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 830 via one or more data medium interfaces. The memory 810 may include at least one program product. The program product has a set (such as, at least one) of program modules configured to perform the functions of various embodiments of the present disclosure.

A program/utility 880 having a set (at least one) of the program modules 870 may be stored in, for example, the memory 810. The program modules 870 include but are not limited to, an operating system, one or more application programs, other programs modules, and program data. Each of these examples, or some combination thereof, may include an implementation of a network environment. The program modules 870 generally perform the functions and/or methods in the embodiments described herein.

The device 800 may also communicate with one or more external devices 890 (such as, a keyboard, a pointing device, a display 891, etc.). Furthermore, the device 800 may also communicate with one or more communication devices enabling a user to interact with the device 800 and/or other devices (such as a network card, modem, etc.) enabling the device 800 to communicate with one or more computer devices. This communication can be performed via the input/output (I/O) interface 892. Also, the device 800 may communicate with one or more networks (such as a local area network (hereafter referred to as LAN), a wide area network (hereafter referred to as WAN) and/or a public network such as an Internet) through a network adapter 893. As illustrated in FIG. 11, the network adapter 893 communicates with other modules of the device 800 over the bus 830. It should be understood that, although not illustrated in FIG. 11, other hardware and/or software modules may be used in connection with the device 800. The hardware and/or software includes, but is not limited to, microcode, device drivers, redundant processing units, external disk drive arrays, RAID systems, tap Drive and data backup storage system.

The processing unit 820 may perform various functional applications and data processing by running programs stored in the system memory 810, for example, to perform the method provided by embodiments of the present disclosure.

It should be illustrated that, in descriptions of the present disclosure, terms such as "first" and "second" are used herein for purposes of description and are not construed as indicating or implying relative importance or significance. Furthermore, in the description of the present disclosure, "multiple" means two or more than two, unless specified otherwise.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

In some embodiments, there is also provided a non-transitory computer readable storage medium including instructions, such as a memory 810 including instructions. The instructions are executable by the processor 820 of the device 800 to perform the above method. For example, the non-transitory computer readable storage medium may be a ROM, a random-access memory (RAM), a CD-ROM, a magnetic tape, a floppy disk, an optical data storage device, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. A method comprising:
displaying a following sub-resource of a current sub-resource in response to a first sliding operation received on the current sub-resource in a case of and the current sub-resource being non last sub-resource comprised in a first multimedia resource, wherein the following sub-resource is adjacent to the current sub-resource and is to be displayed along a sliding direction of the sliding operation, and the current sub-resource and the following sub-resource are comprised in the first multimedia resource;
sliding the current sub-resource in the sliding direction for a distance and resetting the current sub-resource to an original position in response to a second sliding operation received on the current sub-resource in a case of the current sub-resource being the last sub-resource comprised in the first multimedia resource;
obtaining a second multimedia resource in response to a next sliding operation after the second sliding operation on the current sub-resource along the sliding direction, wherein the second multimedia resource is associated with the first multimedia resource;
displaying the second multimedia resources;
in response to the current sub-resource being a cover picture of the first multimedia resource, obtaining cover pictures of multiple multimedia resources associated with the first multimedia resource in response to the sliding direction being a first direction;
displaying a list of the multiple multimedia resources on a region of a displaying interface of the current sub-resource, the list comprising the cover pictures of the first multimedia resource and the multiple multimedia resources;
displaying a third multimedia resource on the displaying interface of the current sub-resource in response to an opening instruction on the third multimedia resource;
displaying a cover picture of the third multimedia resource as a selected state; and
returning to the displaying interface of the current sub-resource in response to a returning instruction, the displaying interface comprising the list of the multiple multimedia resources.

2. The method as claimed in claim 1, further comprising:
displaying prompt information on the displaying interface of the current sub-resource, the prompt information indicating that the second multimedia resource will be displayed in response to the next sliding operation on the current sub-resource along the sliding direction.

3. The method as claimed in claim 1, further comprising:
displaying an interactive control on a displaying interface of the current sub-resource.

4. The method as claimed in claim 1, wherein said displaying the second multimedia resource comprises:
displaying a starting picture or a cover picture of the second multimedia resource in response to the second multimedia resource comprising an album, wherein the cover picture comprises description information of the second multimedia resource, or
playing the second multimedia resource in response to the second multimedia resource comprising a video.

5. The method as claimed in claim 1, wherein said obtaining the second multimedia resource comprises:
obtaining multiple multimedia resources, the multiple multimedia resources being owned by an account to which the first multimedia resource belongs; and
selecting the second multimedia resource from the multiple multimedia resources. or,
obtaining multiple multimedia resources, the multiple multimedia resources belonging to the same category as the first multimedia resource; and
selecting the second multimedia resource from the multiple multimedia resources.

6. The method as claimed in claim 1, further comprising:
obtaining a fourth multimedia resource adjacent to the third multimedia resource from the list in response to a sliding operation on a sub-resource included in the third multimedia resource and the third multimedia resource comprising no following sub-resource in a sliding direction of the sliding operation; and
displaying the fourth multimedia resource.

7. The method as claimed in claim 1, further comprising:
closing the list in response to a closing instruction on the list,
wherein the closing instruction comprises:
a click operation on a non-operation region of the displaying interface of the current sub-resource; or
a sliding operation along a second direction on the displaying interface of the current sub-resource.

8. An electronic device, comprising:
a processor; and
a storage device for storing executable instructions,
wherein the processor is configured to execute the executable instructions to:
display a following sub-resource of a current sub-resource in response to a first sliding operation received on the current sub-resource in a case of the current sub-resource being non last sub-resource comprised in a first multimedia resource, wherein the following sub-resource is adjacent to the current sub-resource and is to be displayed along a sliding direction of the sliding operation, and the current sub-resource and the following sub-resource are comprised in the first multimedia resource;
slide the current sub-resource in the sliding direction for a distance and reset the current sub-resource to an original position in response to a second sliding operation received on the current sub-resource in a case of the current sub-resource being the last sub-resource comprised in the first multimedia resource;

obtain a second multimedia resource in response to a next sliding operation after the second sliding operation on the current sub-resource along the sliding direction, wherein the second multimedia resource is associated with the first multimedia resource;

display the second multimedia resource;

in response to the current sub-resource being a cover picture of the first multimedia resource, obtain cover pictures of multiple multimedia resources associated with the first multimedia resource in response to the sliding direction being a first direction;

display a list of the multiple multimedia resources on a region of a displaying interface of the current sub-resource, the list comprising the cover pictures of the first multimedia resource and the multiple multimedia resources;

display a third multimedia resource on the displaying interface of the current sub-resource in response to an opening instruction on the third multimedia resource;

display a cover picture of the third multimedia resource as a selected state; and return to the displaying interface of the current sub-resource in response to a returning instruction, the displaying interface comprising the list of the multiple multimedia resources.

9. The electronic device as claimed in claim 8, wherein the executable instructions comprise instructions to cause the processor to:

display prompt information on the displaying interface of the current sub-resource, the prompt information indicating that the second multimedia resource will be displayed will be displayed in response to the next sliding operation on the current sub-resource along the sliding direction.

10. The electronic device as claimed in claim 8, wherein the executable instructions comprise instructions to cause the processor to:

display an interactive control on a displaying interface of the current sub-resource.

11. The electronic device as claimed in claim 8, wherein the executable instructions comprise instructions to cause the processor to:

display a starting picture or a cover picture of the second multimedia resource in response to the second multimedia resource comprising an album, wherein the cover picture comprises description information of the second multimedia resource, or play the second multimedia resource in response to the second multimedia resource comprising a video.

12. The electronic device as claimed in claim 8, wherein the executable instructions comprise instructions to cause the processor to:

obtain multiple multimedia resources, the multiple multimedia resources being owned by an account to which the first multimedia resource belongs; and select the second multimedia resource from the multiple multimedia resources. or, obtain multiple multimedia resources, the multiple multimedia resources belonging to the same category as the first multimedia resource; and select the second multimedia resource from the multiple multimedia resources.

13. A non-transitory computer-readable storage medium having stored therein instructions that, when executed by a processor of an electronic device, causes the electronic device to perform a method for switching among multimedia resources, the method comprising:

displaying a following sub-resource of a current sub-resource in response to a first sliding operation received on the current sub-resource in a case of the current sub-resource being non last sub-resource comprised in a first multimedia resource, wherein the following sub-resource is adjacent to the current sub-resource and is to be displayed along a sliding direction of the sliding operation, and the current sub-resource and the following sub-resource are comprised in the first multimedia resource;

sliding the current sub-resource in the sliding direction for a distance and resetting the current sub-resource to an original position in response to a second sliding operation received on the current sub-resource in a case of the current sub-resource being the last sub-resource comprised in the first multimedia resource;

obtaining a second multimedia resource in response to a next sliding operation after the second sliding operation on the current sub-resource along the sliding direction, wherein the second multimedia resource is associated with the first multimedia resource;

displaying the second multimedia resources;

in response to the current sub-resource being a cover picture of the first multimedia resource, obtaining cover pictures of multiple multimedia resources associated with the first multimedia resource in response to the sliding direction being a first direction;

displaying a list of the multiple multimedia resources on a region of a displaying interface of the current sub-resource, the list comprising the cover pictures of the first multimedia resource and the multiple multimedia resources;

displaying a third multimedia resource on the displaying interface of the current sub- resource in response to an opening instruction on the third multimedia resource;

displaying a cover picture of the third multimedia resource as a selected state; and returning to the displaying interface of the current sub-resource in response to a returning instruction, the displaying interface comprising the list of the multiple multimedia resources.

14. The non-transitory computer-readable storage medium as claimed in claim 13, the method further comprising:

displaying prompt information on the displaying interface of the current sub-resource, the prompt information indicating that the second multimedia resource will be displayed in response to the next sliding operation on the current sub-resource along the sliding direction.

15. The non-transitory computer-readable storage medium as claimed in claim 13, the method further comprising:

displaying an interactive control on a displaying interface of the current sub-resource.

16. The non-transitory computer-readable storage medium as claimed in claim 13, wherein said displaying the second multimedia resource comprises:

displaying a starting picture or a cover picture of the second multimedia resource in response to the second multimedia resource comprising an album, wherein the cover picture comprises description information of the second multimedia resource, or playing the second multimedia resource in response to the second multimedia resource comprising a video.

17. The non-transitory computer-readable storage medium as claimed in claim 13, wherein said obtaining the second multimedia resource comprises:
- obtaining multiple multimedia resources, the multiple multimedia resources being owned by an account to which the first multimedia resource belongs; and
- selecting the second multimedia resource from the multiple multimedia resources. or,
- obtaining multiple multimedia resources, the multiple multimedia resources belonging to the same category as the first multimedia resource; and
- selecting the second multimedia resource from the multiple multimedia resources.

\* \* \* \* \*